United States Patent
Bartlett, Jr.

[11] Patent Number: 6,138,403
[45] Date of Patent: Oct. 31, 2000

[54] WIRE CHANNEL BENCH TRAY

[76] Inventor: J. Pike Bartlett, Jr., CR69 Box 477, Friendship, Me. 04547

[21] Appl. No.: 09/166,325

[22] Filed: Oct. 5, 1998

[51] Int. Cl.[7] ................................ A01G 9/14; A01G 9/00
[52] U.S. Cl. .................................................................. 47/18
[58] Field of Search ............................... 47/17, 18, 66.5, 47/66.1, 66.6; 206/513; 211/85.23, 85.31, 127.1

[56] References Cited

U.S. PATENT DOCUMENTS

| | | | |
|---|---|---|---|
| 1,360,669 | 11/1920 | Nielsen ............................................ | 47/18 |
| 2,545,717 | 3/1951 | Voigt ............................................... | 47/18 |
| 2,905,353 | 9/1959 | Weber ...................................... | 206/513 X |
| 3,108,400 | 10/1963 | Wolfe, Jr. ........................................ | 47/18 |
| 3,784,044 | 1/1974 | Bruggeman et al. ......................... | 220/19 |
| 3,866,788 | 2/1975 | Smit ................................................ | 220/19 |
| 3,913,751 | 10/1975 | Faircloth et al. ........................... | 47/17 X |
| 4,850,134 | 7/1989 | Snekkenes ..................................... | 47/18 |

FOREIGN PATENT DOCUMENTS

| | | | |
|---|---|---|---|
| 1 260 270 | 12/1982 | Canada ........................................ | 47/18 |
| 2 546 031 | 11/1984 | France ......................................... | 47/18 |
| 37 22377 | 3/1988 | Germany ..................................... | 47/18 |
| 7-75447 | 12/1993 | Japan .......................................... | 47/18 |

*Primary Examiner*—Charles T. Jordan
*Assistant Examiner*—Jeffrey L. Gellner
*Attorney, Agent, or Firm*—William Nitkin

[57] ABSTRACT

A wire bench tray is disclosed for use in a greenhouse environment, such tray moving over support roller pipes and having an upper surface and a lower structure defining a plurality of channels with openings therein in which to receive heating and/or irrigation tubing passing therethrough.

9 Claims, 2 Drawing Sheets

WIRE CHANNEL BENCH TRAY

BACKGROUND OF THE INVENTION

1. Field of the Invention

This invention resides in the area of bench trays that move over rollers in greenhouses and more particularly relates to a wire form bench tray having channels defined therein to carry both heat and/or water tubing.

2. Description of the Prior Art

Commercial greenhouses use tables or "benches" on which to grow plants. These benches keep the plants off the ground which higher location helps the plants avoid disease and allows for easier plant handling. The benches have metal frames supporting a series of support rollers, usually pipes. In the past the benches were made of wood or concrete until the mid-1970's when metal benches came into use. These flat planar metal benches were made of structural steel or aluminum tube framing with a wire mesh or diamond-shaped "expanded metal" surface. The openings in such bench surfaces allow for air circulation therethrough, reducing the humidity levels around the plants which drier conditions reduce some plant disease problems. Such benches supporting potted plants rest above the surface of the support roller pipes and are moved laterally by pushing the benches to move over the support roller pipes. Movement of the benches eliminates the need for establishing permanent walkways in a greenhouse as the benches can be moved aside to provide walk way openings where and when needed, thereby maximizing the surface area available for growing plants. The use of rolling benches in greenhouses can provide up to 20% more growing space in each greenhouse.

A problem with rolling bench trays is where to put the heat and/or water irrigation tubing. Earlier greenhouses used pipes carrying hot water or steam running under the benches. A common method of heating greenhouses today is the use of flexible tubing to carry hot water which tubing is disposed under the benches close to the plant roots. However, when a bench is moved, the plants thereon become moved out of alignment with the heat tubing which tubing remains stationary, resulting in uneven heating and significant waste of heat. Addressing this problem led to the common practice of today of placing flexible rubber tubing carrying hot water under, or on top of, the benches very close to the plants. If the heat tubing is placed under the bench tray, though, it does not move when the bench tray is moved. The heat tubing typically has a diameter of 0.25–0.75 inch and is positioned at 2–4 inch intervals running under the length of the bench tray. If the heat tubing is positioned on top of the bench tray, it interferes with the positioning of the plants and many plants cannot sit level.

The method of watering plants in greenhouses has also changed over the years. Watering by hand from a garden hose gave way to overhead spray booms which travel the length of the greenhouse. This method, in turn, was replaced by small irrigation tubing extending into each pot where the small tubes extend from a larger water tubing placed on the top of each bench.

Thus, a continuing problem with greenhouse benches has been where to put the heating and/or irrigation tubing so that they are not in the way of bench tray movement when rolling side to side or in the way of placing the maximum number of plants on the top of the bench tray. The heat and/or irrigation tubing when placed on the top of the bench tray often displace the pots, and heat may come in direct contact with a plant pot as the bench tray is moved which effect is undesirable. If the heat and/or irrigation tubing are placed under the bench tray, then the heat cannot move with the plants and will not be centered under the pots and no longer uniformly provide heat to the plants. Further, as mentioned above, heat and/or irrigation tubing placed under the benches can get in the way of support roller pipe movement when the bench is moved laterally on the support roller pipes from one position to another.

SUMMARY OF THE INVENTION

It is an object of this invention to provide a bench tray designed to move over the support roller pipes on a metal frame support in a greenhouse, the new bench tray being made of a top surface of planar wire mesh and having multiple wire channels disposed thereunder for receiving and supporting heat and/or irrigation tubing. The wire channels keep the heat and/or water tubing positioned therein and located securely under the plants. By having the tubing placed within these channels of the bench tray, movement of the bench tray does not affect the delivery of heat or water to the potted plants. The heat and/or irrigation tubing move with the bench tray because they are held within its channels.

DESCRIPTION OF THE PREFERRED EMBODIMENT(S)

Figure 1:
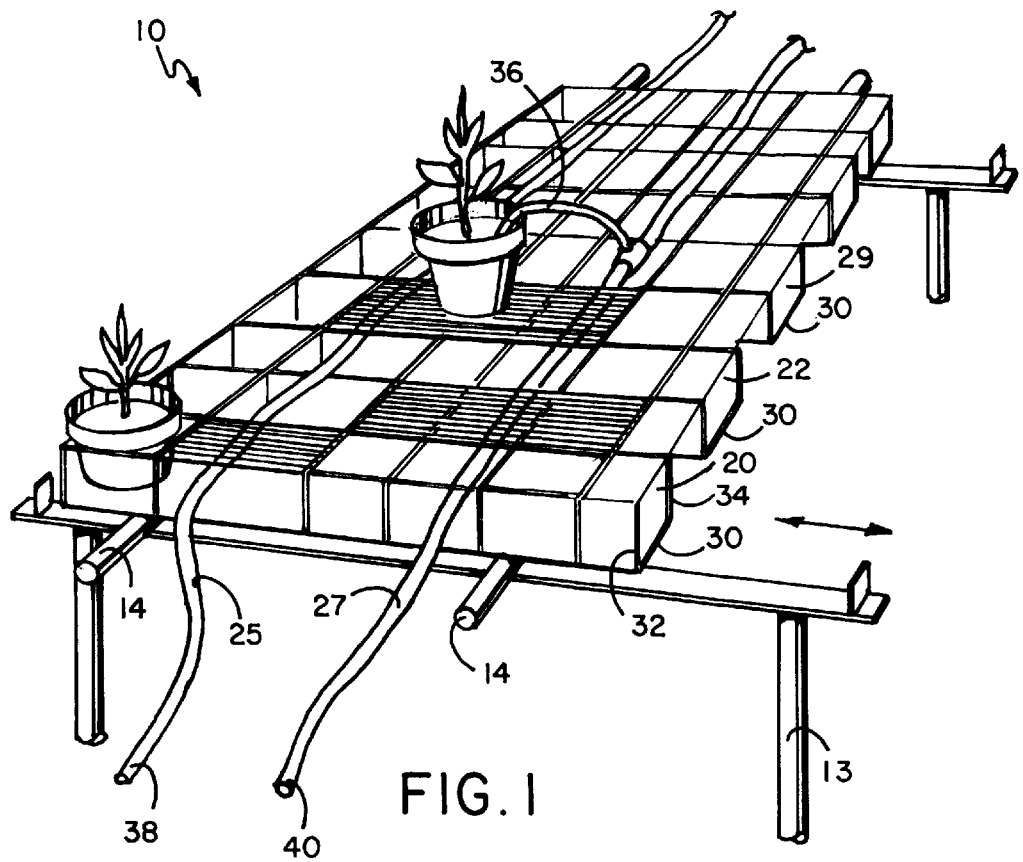
FIG. 1 illustrates a perspective view of the wire channel bench tray of this invention resting on a series of support roller pipes above a metal frame support in a greenhouse.

FIG. 1 illustrates wire channel bench tray 10 of this invention situated above support roller pipes 14 which rest on frame support 13. Tray 10 is designed to roll over support roller pipes 14, which movement is often required in a greenhouse for the creation of walkways therein. As seen in this view, it is the lower tray structure 30 of the channels, such as channel 20, which contact support roller pipes 14 and facilitate the lateral movement of tray 10.

Figure 2:
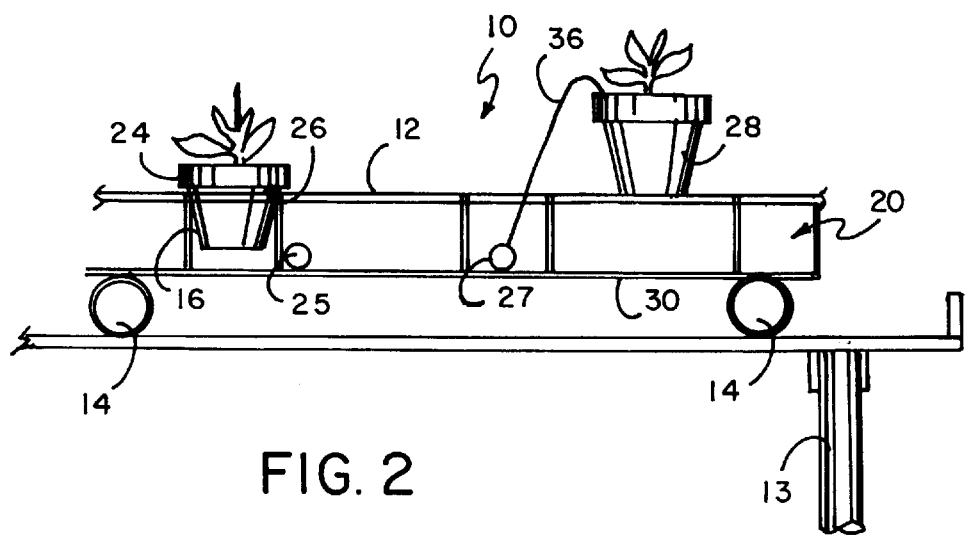
FIG. 2 illustrates an end elevational view of the wire channel bench tray with heat and/or irrigation tubing passing through the channels.

FIG. 2 illustrates an end view of wire channel bench tray 10. The upper surface of tray 10 can be constructed of wire mesh of sufficient strength and durability to support itself as well as the potted plants disposed thereon. Tray 10 in a preferred embodiment is generally rectangular in shape with the wire mesh in one embodiment forming a flat, planar upper tray surface structure 12 or, in another embodiment, upper tray surface structure 12 can have a plurality of apertures 16 defined therein for receiving individual potted plants. Lip-supported pot 24 in FIG. 2 is supported at its lip 26 on upper tray surface structure 12 surrounding each aperture 16. In this latter embodiment a substantial portion of each pot is situated below the surface of upper tray surface structure 12 with the pots' lips supported by upper tray surface structure 12. Apertures 16 formed in upper tray surface structure 12 can be rectangular in shape, adapted to receive generally rectangular or circular pots therein. Alternatively, upper tray surface structure 12 can have smaller apertures defined therein such that many larger potted plants would rest on planar upper tray surface structure 12 in the manner of base-supported pot 28, as seen in FIG. 2.

Figure 3:
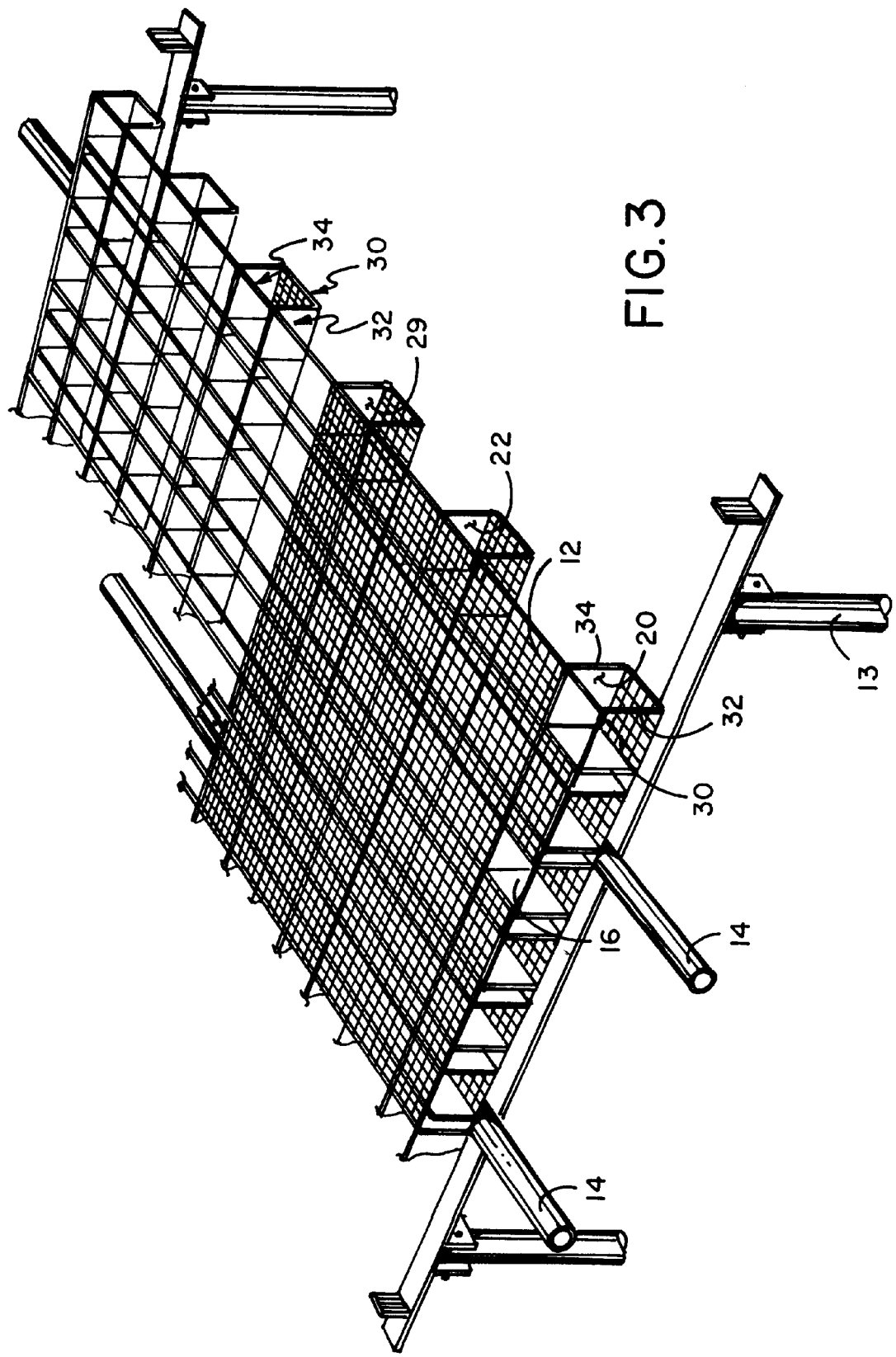
FIG. 3 illustrates an alternate perspective view of the wire channel bench tray of this invention.

With bench tray 10 comprising a wire mesh at its upper portion, as seen in FIG. 3, its lower portion can include a plurality of multiple wire channels, such as first, second and third channels 20, 22 and 24, respectively, which contain heat and irrigation tubing traveling therethrough. Bottom lower tray structure 30 of each channel rests on support roller pipes 14. As seen in FIGS. 1 and 3, each channel has a plurality of wire members such as forming spaced-apart first and second channel sides 32 and 34, each channel side extending on each side, respectively, from bottom 30 up to the top where it meets upper tray surface structure 12, forming a rectangular shape in cross section. Channels, such as first and second channels 20 and 22, forming the lower portion of tray 10, hold heat tubing 25 and/or irrigation tubes 27 traveling therethrough between its wire structure. Heat and irrigation tubing 25 and 27, respectively, can be threaded through the openings in the channels within its wire formed sides in any desired position to deliver heat and water, respectively, to the potted plants at any position on tray 10. Smaller pipes, such as pipe 36, can extend from larger irrigation pipes 27 to reach each potted plant. When tray 10 is moved along support roller pipes 14, all the heat and irrigation tubing is supported within the channels and moves along with the tray, thus not obstructing lateral tray movement or the placement of plants on the tray. In this invention heat tubing is supported by the channels such that heat can be supplied in close proximity to the roots of the potted plants. Similarly, water tubing can be placed near the plant pots to facilitate smaller tubes extending therefrom to deliver water to the individual pots. The extending ends 38 and 40 of the heat and irrigation tubing, respectively, are flexible enough to move with tray 10 when it is moved.

Although the present invention has been described with reference to particular embodiments, it will be apparent to those skilled in the art that variations and modifications can be substituted therefor without departing from the principles and spirit of the invention.

I claim:

1. A bench tray of the type used in green houses supported on a plurality of support roller pipes on a support frame, said bench tray having a length and a width and having plants in plant containers disposed thereon, and heating and irrigation tubing for supplying heat and/or water, wherein said bench tray includes a planar upper tray surface structure for receiving said potted plants thereon; and said bench tray includes a lower tray structure having a bottom, said lower tray structure disposed beneath said upper tray surface structure and defining at least one channel between said upper tray surface structure and said lower tray structure for receipt of said heating and irrigation tubing through said channel in proximity to said plant containers.

2. The bench tray of claim 1 wherein said lower tray structure is formed by a plurality of spaced-apart channels formed of wire, said channels each having a height, a width and a bottom, said wire forming said channels, said channels having a plurality of openings defined therebetween to receive said heating and/or irrigation tubing, said tubing disposed below said upper tray surface structure and above said lower tray structure so as not to obstruct lateral tray movement on said support roller pipes and not to obstruct positioning of said plant containers on said upper tray surface structure.

3. The bench tray of claim 2 wherein said upper tray surface structure is made of a wire mesh material and said channels are disposed transverse to said support roller pipes, said channels each extending beneath said upper tray surface structure a like distance and supporting said upper tray surface structure above said support roller pipes at a height equal to said height of said channels.

4. The bench tray of claim 3 wherein each of said channels further includes:

a first channel side formed of parallel wires, said first channel side having a top and a bottom, said top attached to said upper tray surface structure and said bottom attached to said bottom of said lower tray structure;

a second channel side formed of parallel wires, said second channel side having a top and a bottom, said top of said second channel side attached to said upper tray surface structure and said bottom of said second channel side attached to said bottom of said lower tray structure, said first channel side and said second channel side being parallel to one another and defining a distance therebetween;

a base formed from said bottom of said lower tray structure, said base having a first base side and a second base side, said first base side spaced apart from said second base side the same distance apart as said distance between said first and second channel sides, said first base side attached to the bottom of said first channel side, said second base side attached to the bottom of said second channel side; and said first channel side, said second channel side and said base forming an open-ended channel made of wire having a plurality of openings formed therein by spaces defined between said wires for allowing the positioning therethrough of said heating and/or irrigation tubing.

5. The bench tray of claim 4 wherein said plurality of said channels extend the width of said tray, said channels being spaced apart from one another a distance and extending substantially parallel to one another, said plurality of channels being disposed along said length of said tray, said openings defined between the wire framework of each of said channels allowing said heating and/or irrigation tubing to be passed from one channel to another channel through selected of said openings defined between said wires of said channels.

6. The bench tray of claim 5 wherein said upper tray surface structure includes at least one plant receipt aperture defined therein to receive a plant container therein.

7. The bench tray of claim 6 wherein said plant receipt aperture is of a size to allow said plant container to extend therein while also allowing another plant container to be supported thereon.

8. A method of providing heating and/or irrigation tubing to plant containers disposed on a movable wire bench tray disposed above support roller pipes on a frame support in a greenhouse, comprising the steps of:

providing an upper planar surface structure for receiving said plant containers;

providing a lower surface structure to ride on said support roller pipes disposed a distance below said upper planar surface structure;

providing a plurality of openings defined between said upper planar surface structure and said lower surface structure; and passing said heating and/or irrigation tubing through said openings above said lower surface structure and below said upper planar surface structure to reach a desired location on said tray in proximity to said plant containers so as not to interfere with lateral rolling of said tray on said support roller pipes and not to interfere with the placement of plant containers on said upper planar surface structure.

9. In a support bench for supporting a plurality of plants comprising a support frame, a plurality of support roller pipes supported by said support frame, a bench tray supported on said support roller pipes for rolling side-to-side movement and at least one length of tubing for delivering heat or water to the plants, the improvement comprising:

said bench tray having a planar upper tray surface structure for receiving potted plants and a lower surface contacting said support roller pipes, and, a plurality of spacers holding said upper tray surface above said lower surface and defining at least one channel for receiving said at least one length of tubing, whereby, said length of tubing is maintained in close proximity to the potted plants during side-to-side movement of said bench tray.

* * * * *